M. S. CHAPIN.
VEHICLE FRAME.
APPLICATION FILED FEB. 16, 1914.

1,153,602.

Patented Sept. 14, 1915.
3 SHEETS—SHEET 1.

Witnesses:
H. E. Hartwell
Caroline N. Willis

Inventor:
Maurice S. Chapin.
By Chapin Co
Attorneys

M. S. CHAPIN.
VEHICLE FRAME.
APPLICATION FILED FEB. 16, 1914.

1,153,602.

Patented Sept. 14, 1915.
3 SHEETS—SHEET 2.

Witnesses:
H. E. Hartwell.
Caroline N. Willis

Inventor:
Maurice S. Chapin.
By Chapin & Co
Attorney.

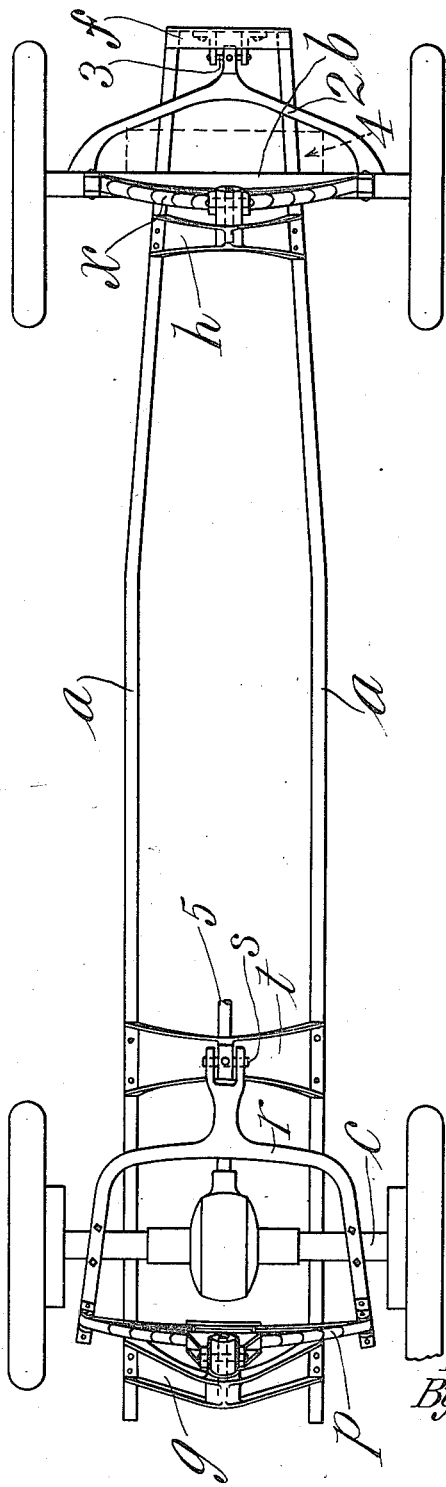

UNITED STATES PATENT OFFICE.

MAURICE S. CHAPIN, OF SPRINGFIELD, MASSACHUSETTS.

VEHICLE-FRAME.

1,153,602.  Specification of Letters Patent.  Patented Sept. 14, 1915.

Application filed February 16, 1914. Serial No. 818,963.

*To all whom it may concern:*

Be it known that I, MAURICE S. CHAPIN, a citizen of the United States of America, residing in the city of Springfield, county of Hampden, and State of Massachusetts, have invented certain new and useful Improvements in Vehicle-Frames, of which the following is the specification.

This invention relates generally to the construction of self-propelled vehicles and specifically to the construction of the running gear and complete chassis, the object of the invention being to construct a vehicle of the class referred to, adapted to have a frame on which the motor and body are carried so supported on the axles of the vehicle as to be capable of having more or less swinging movement on an axis running longitudinally through the center of the vehicle, the supports for said frame being so disposed that the center of gravity of said frame and the parts carried thereon shall lie below axial line above referred to.

The invention further resides in certain constructions of the various parts and combinations of parts incidental to the embodiment of an axially supported frame above mentioned in a self-propelled vehicle all of which will be described in the following specification and pointed out in the claims appended thereto.

Figure 1:
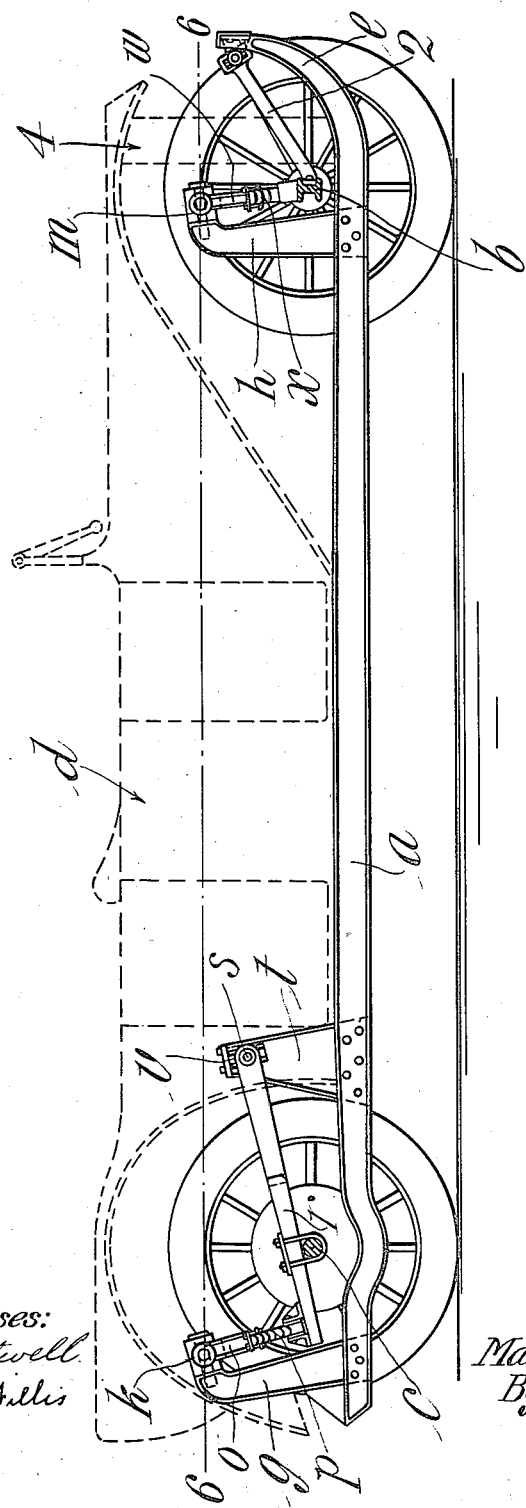
Figure 2:
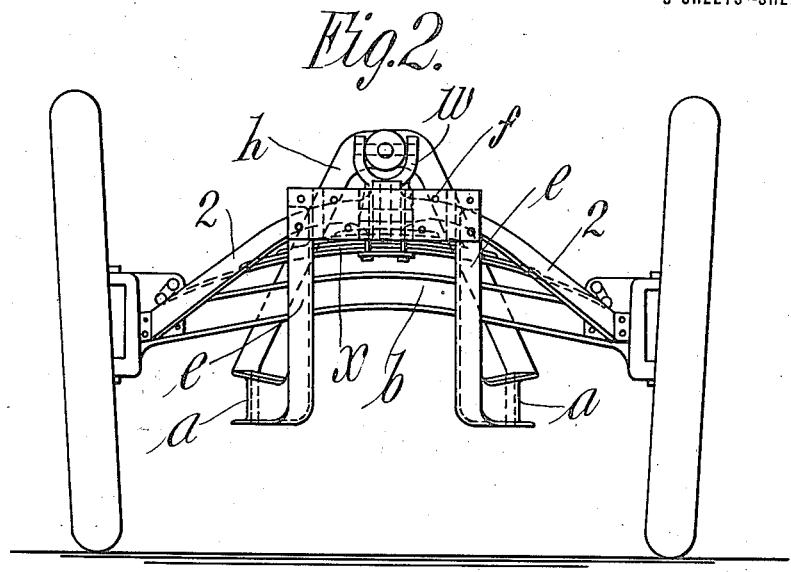
Figure 3:
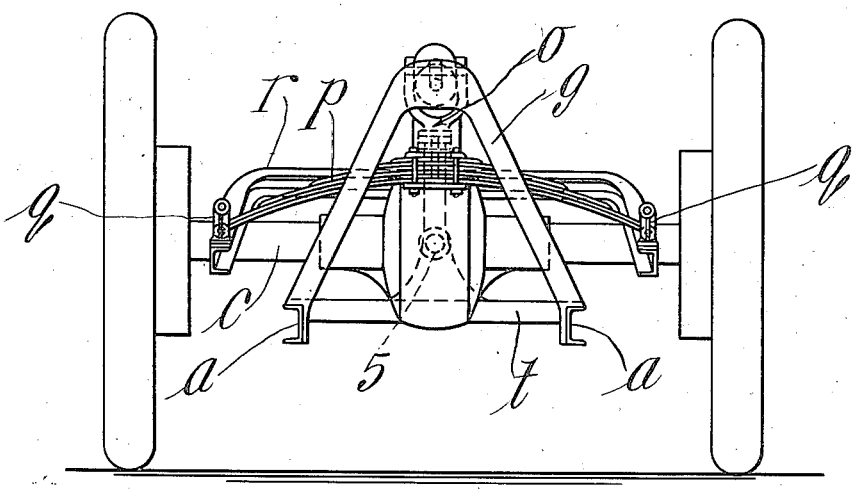

The invention is clearly illustrated in the accompanying drawings in which:

Figure 1 is a side elevation of the chassis of a motor vehicle embodying the invention, the body of the vehicle being shown in dotted lines. Fig. 2 is an elevation of the frame and the front axle viewed from the front end of the vehicle. Fig. 3 is an elevation of the rear axle and frame construction as seen from the rear of the vehicle, and Fig. 4 is a plan view of the chassis.

It will be understood of course that only such parts are shown in these drawings as relate to the invention, many of the details of motor vehicle construction being omitted.

Referring to these drawings: $a$ indicates the frame of the machine, $b$ the front axle and $c$ the rear axle, the body of the vehicle being shown in dotted lines only, indicated by $d$. The frame $a$ is of the type generally known as underslung, that is, it extends beneath both the front and rear axle and is supported thereon in the following manner. The forward ends of the longitudinal members of the frame are turned upward as at $e$ and united by a cross bar at $f$ (Fig. 2). The rear ends of the frame have rigidly fixed thereon a truss frame $g$ (see Figs. 1 and 3). Rigidly secured to the frame near the forward end thereof and just back of the front axle $b$ is another truss frame $h$ extending above the frame to substantially the same height as the frame $g$. At the upper end of these two frames $g$ and $h$ and on a longitudinal central line of the frame $a$ are supported the universal joints, $k$ on the frame $g$ and $m$ on the frame $h$. These universal joints thus located are therefore, in substantial alinement horizontally and vertically.

The forked member $o$ is supported on the transverse axis of the universal joint $k$ and to the lower end of this member $o$ is secured the rear spring $p$ in any suitable manner. This spring $p$ is shown in Fig. 3 extended transversely of the frame, its two extremities being supported on suitable vertically arranged links $q$ which in turn are secured to the ends of the forked frame $r$, clearly shown in Figs. 1, 3, and 4. This forked frame $r$ extends over the upper side of the axle $c$ and is secured fixedly thereto, as shown in the drawing, it being pivotally attached as at $s$, to a bridge frame $t$ extending transversely of the vehicle and secured to the longitudinal members of the frame $a$, this being seen clearly in Figs. 1 and 4. The connection with the forked frame $r$ with its bridge support $t$ is also, by means of a universal joint indicated at $v$, the frame being supported on the transverse axis of said joint. The forward end of the frame is supported on the axle $b$ in substantially the same manner as the rear end is supported on the axle $c$, that is to say, the forked member $w$ is substantially the same as the forked member $o$ and is, like that member, supported on the transverse axis of the universal joint $m$, the lower end of said member being connected to a forward spring $x$ extending transversely of the frame, its two extremities being secured to the axle $e$ by links in the usual manner, substantially like the links $q$ described in connection with the rear spring. The front axle is positioned relative to the front end of the frame by means of a forked frame 2 pivotally supported at 3 on the central longitudinal line of the frame and like the frame $r$ provided with the universal joint connection with the transverse member $f$ (see Fig. 2) which extends between the two upwardly extending portions e of the side frames a, the forked frame 2 being supported on the transverse axis of said universal joint. The body of the vehicle indicated by d (Fig. 1) is bolted to the frame a in the usual manner and on this frame the engine may be supported back of the truss frame h, the radiator indicated by dotted lines in Fig. 1, and by the numeral 4 being supported on the frame between the arms of the forked frame 2. This construction brings the location of the engine relatively very close to the ground and in such position as to get an approximately straight line drive back to the rear axle, the driving shaft of the vehicle being indicated by 5 (see Figs. 1 and 4). This driving shaft, of course, will be provided with the usual universal joint connections between the differential and the engine whereby the various movements of the body and its frame relative to the axles will not operate to produce any binding effect of the moving parts of the motor in the bearings. The construction also permits, as will be seen from Fig. 1, a very low suspension of the body and all of the weights carried by the axle, and even with the two truss frames g and h made much lower relatively than they are shown in the drawings, the center of gravity of the frame and the parts that it carries would still be below the dotted line 6 which runs through the two universal joints k and m and indicates the axis of transverse oscillation of the frame and the body of the vehicle. There would be no longitudinal movement of the body or the frame relative to the two axles or vice versa since the forked frame r constitutes a rigid connection between the rear axle c and the frame at one end, and the fork 2 constitutes a like rigid connection between the axle b and the frame at the other end. It will be of course, understood that in order to make the construction as clear as possible that the relative proportions of the various parts of the frame have been somewhat enlarged, notably the truss frames and the bridge frame t and so forth.

From the foregoing description it is clear that this construction provides for the support of the vehicle body and frame and the various other parts of the vehicle carried thereby, the two points of support indicated by the universal joints k and m in substantial axial alinement, these points of support being located relative to the frame and the parts carried thereby in such manner as to bring the center of gravity below this axial line, whereby the entire frame and body of the vehicle may have an extending oscillatory movement within certain limits transversely to the line of movement of the vehicle, yet providing at the same time for the free vertical movements of the body on its supporting springs. The word "underslung" in the claims is used in the sense generally attributed to it in this art, viz., it signifies a frame extending beneath, instead of above the axles which support it.

What I claim is:

1. In a motor vehicle, a pair of axles, a frame to carry the vehicle body and motor, a spring mounted on each axle and a frame-support secured to each spring on the central longitudinal line of the vehicle, and means of connection between said frame and the supports therefor and comprising a universal joint whereby said frame may have a swinging movement on its supports both in line with and transversely to the axle.

2. In a motor vehicle, a pair of axles, an underslung frame to carry the vehicle body and motor, and a single support for the opposite ends of said frame, said support being located on the central longitudinal line of the vehicle and above the axles, whereby the center of gravity of said frame and body will lie below the plane of the points of support thereof.

3. In a motor vehicle, a pair of axles, a frame extending beneath the axles, a spring carried by each axle, a frame support secured to each spring, a rigid member near each axle extending from side to side of the frame, and a pivotal connection between said supports and said rigid members, said frame supports being located on the central longitudinal line of the frame.

4. In a motor vehicle, a frame to carry the body of the vehicle and a motor, a pair of axles, a member secured to each axle and having a pivotal connection with said frame, and serving to maintain said axles in fixed relation to the frame, while permitting the movement of the frame relative to the axles, a spring carried by each member, a frame support on said springs and means to pivotally suspend said frame on said supports, said suspension means being located on the central longitudinal line of the vehicle, and above the frame thereof.

MAURICE S. CHAPIN.

Witnesses:
H. E. HARTWELL,
EDITH M. POTTER.